(12) United States Patent
Mariappan et al.

(10) Patent No.: US 11,811,776 B2
(45) Date of Patent: Nov. 7, 2023

(54) ACCESSING SHARED PARTITIONS ON A STORAGE DRIVE OF A REMOTE DEVICE

(71) Applicant: Western Digital Technologies, Inc., San Jose, CA (US)

(72) Inventors: Vithya Mariappan, Karnataka (IN); Narendhiran Chinnaanangur Ravimohan, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 532 days.

(21) Appl. No.: 16/917,484

(22) Filed: Jun. 30, 2020

(65) Prior Publication Data

US 2021/0409413 A1 Dec. 30, 2021

(51) Int. Cl.
*H04L 9/40* (2022.01)
*G06F 3/06* (2006.01)
*G06K 7/14* (2006.01)
*G06K 19/06* (2006.01)

(52) U.S. Cl.
CPC .......... *H04L 63/102* (2013.01); *G06F 3/0622* (2013.01); *G06F 3/0644* (2013.01); *G06F 3/0659* (2013.01); *G06F 3/0679* (2013.01); *G06K 7/1417* (2013.01); *G06K 19/06037* (2013.01); *H04L 63/08* (2013.01)

(58) Field of Classification Search
None
See application file for complete search history.

(56) References Cited

U.S. PATENT DOCUMENTS

| 10,177,978 | B2 | 1/2019 | McEntee | |
|---|---|---|---|---|
| 2005/0216920 | A1* | 9/2005 | Tewari | G06F 9/5016 |
| | | | | 719/324 |
| 2015/0278805 | A1* | 10/2015 | Spencer, III | G06Q 20/3274 |
| | | | | 705/44 |
| 2015/0288670 | A1* | 10/2015 | Bhooshan | H04L 12/6418 |
| | | | | 726/5 |
| 2016/0140041 | A1* | 5/2016 | Niu | G06F 3/0631 |
| | | | | 711/103 |
| 2018/0013621 | A1* | 1/2018 | McEntee | G06F 16/1834 |
| 2020/0133703 | A1* | 4/2020 | Sun | G06F 3/0664 |
| 2021/0382587 | A1* | 12/2021 | Heikkinen | G06F 3/04847 |

* cited by examiner

*Primary Examiner* — Charles Rones
*Assistant Examiner* — Jonah C Krieger
(74) *Attorney, Agent, or Firm* — Chang & Hale LLP

(57) ABSTRACT

Systems and methods are disclosed that enable shared partitions to be created on devices owned and operated by trusted persons (e.g., family or friends). The disclosed devices and methods provide for partitioning of stored devices and designating one or more of the partitions for sharing with other devices. Access to the shared partitions is managed using coded images thereby requiring the devices to be physically close to one another. Consequently, people sharing the storage partitions are required to meet in person to grant access, increasing the chances that the persons know and trust one another.

19 Claims, 9 Drawing Sheets

ACCESSING SHARED PARTITIONS ON A STORAGE DRIVE OF A REMOTE DEVICE

BACKGROUND

Field

This disclosure relates to data storage systems. More particularly, the disclosure relates to accessing shared partitions on a storage drive of a remote device.

Description of Related Art

Data can be stored using a variety of different strategies. Data can be stored locally using a user's own devices. Data may also be stored using third-party services such as, for example, cloud storage.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1A:
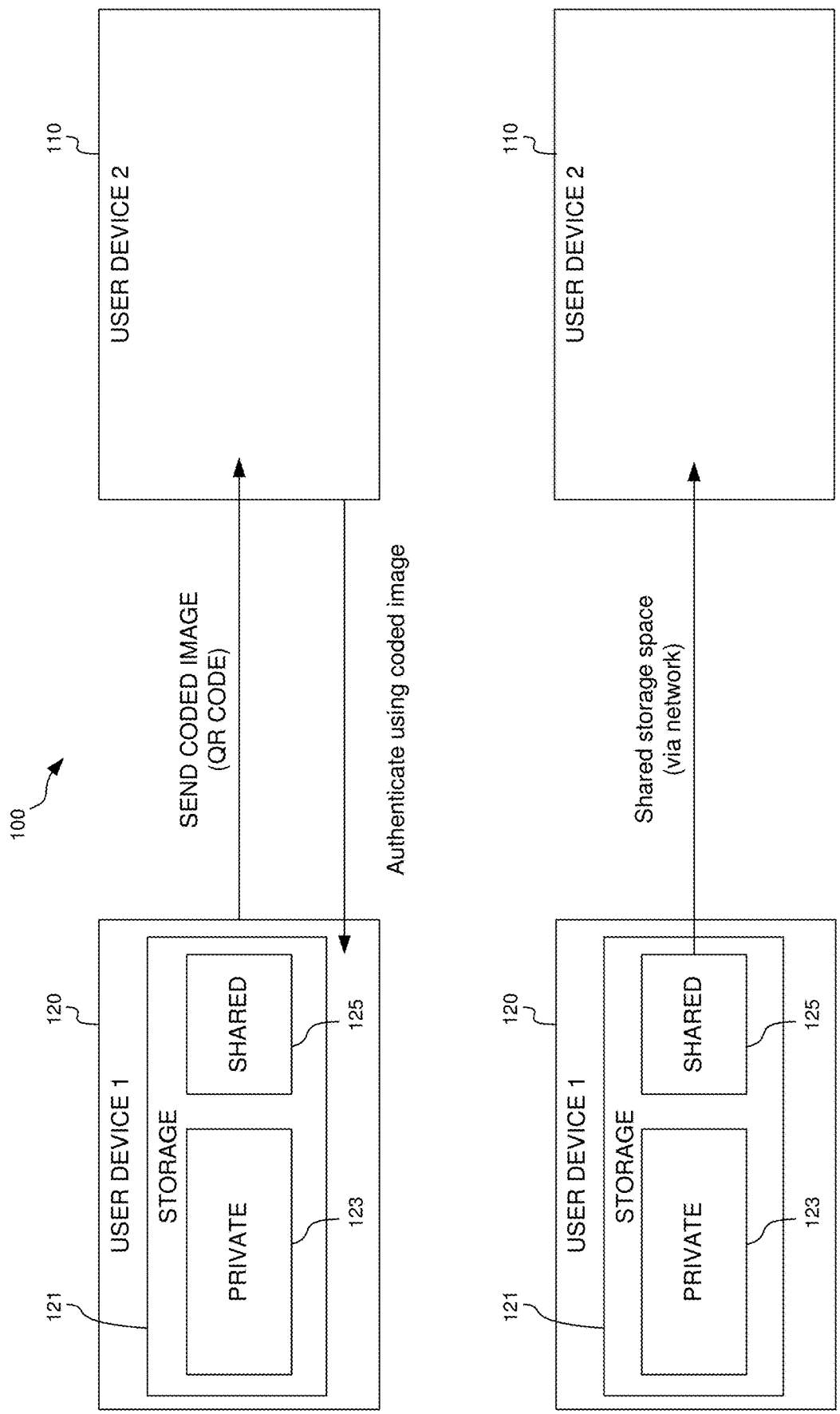
FIG. 1A illustrates a block diagram of an example process for sharing a partition on a first user device with a second user device and authenticating access to the shared partition using a coded image.

While certain embodiments are described, these embodiments are presented by way of example only, and are not intended to limit the scope of protection. Indeed, the novel methods and devices described herein may be embodied in a variety of other forms. Furthermore, various omissions, substitutions and changes in the form of the methods and devices described herein may be made without departing from the scope of protection.
Overview With the ever-increasing amount of data to be stored, many different strategies have been devised to accommodate the demand for storage. Solutions include purchasing and managing hard disk drives, which may be capable of storing terabytes of data. Other solutions include storing data with cloud-based services. Cloud-based services comprise a relatively large number of computers connected to a network, such as the Internet, where people or companies can rent data storage as and when they need it. Cloud-based storage can be considered an external storage solution that enables a person to save, share, and view files online without requiring that these documents be stored locally on a personal hard drive. Cloud-based storage offers advantages such as easy storage and access to files, easy collaboration, and synchronization across multiple devices. However, there are also disadvantages associated with it, namely security and cost. For example, although cloud storage enables saving relatively large amounts of data, cloud services offer limited amounts of free storage. When a user requires more storage, the costs can be prohibitive. Furthermore, storing data with a third party raises concerns related to ownership and privacy of that data.

Accordingly, to address these and other issues, disclosed herein are systems, devices, and methods that enable shared partitions to be created on devices owned and operated by trusted persons (e.g., family or friends). The disclosed devices and methods provide for partitioning of storage devices and designating one or more of the partitions for sharing with other devices. Access to the shared partitions is managed using coded images thereby requiring the devices to be physically close to one another. Consequently, people sharing the storage partitions are required to meet in person to grant access, increasing the chances that the persons know and trust one another.

The disclosed devices and methods incorporate features of cloud storage in removable storage devices. Advantageously, this provides a low-cost, shareable storage for users. This can facilitate saving, sharing, and viewing files in physical storage devices owned and managed by a trusted person thereby reducing dependency on cloud storage.

The price per byte of internal storage of devices or removable storage, e.g., secure digital cars (SD cards) or universal serial bus drives (USB drives), is decreasing. However, efficient use of high capacity storage devices may be challenging for a single person. The disclosed devices and methods enable multiple people to securely share internal or removable storage. The result is that internal and/or removable storage can provide advantages similar to cloud storage without similar disadvantages.

The disclosed devices and methods facilitate sharing of storage through a network, such as the Internet. The storage capacity of internal storage or removable storage can be dynamically partitioned to create one or more private partitions and one or more shared partitions. The one or more shared partitions can be configured to be accessed by one or more parties. A person with access to the shared partition does not need to own the device with the internal storage or the removable storage to have access to the shared partition.

The disclosed devices and methods provide for dynamic partitioning to share storage. The disclosed devices and methods can also require selective in-person authentication, such as for initial authentication. The initial authentication is accomplished using coded images that are displayed on the device requesting access and that are scanned by the device providing the shared storage. This requires the devices be in close physical proximity, or that the people that use the devices to meet in person to authenticate access. Subsequent access can be authenticated using stored keys or other similar methods. This allows people accessing the shared storage to be remote from the device with the shared storage after initial authentication.

The disclosed devices and methods can use peer-to-peer file transfers or one-to-one file transfers for the sharing of files on the shared partitions. In some embodiments, there is no temporary cloud storage used when transferring a file from the shared partition to the device accessing the file. In certain implementations, there is little or no staging used when sharing a file between devices. In some embodiments, a user can request a file from the shared partition and can be notified when the transfer will be available. This may be helpful when the device hosting the shared partition is busy or unavailable.

The disclosed devices and methods provide a number of advantages. For example, using a plurality of devices with shared partitions, a user can create a storage analogous to a cloud storage system operated by a third party. Such an arrangement could be used for a local backup comparable to a cloud backup service. As another example, the disclosed devices and methods require in-person authentication to make sure that data is being stored with a known and/or trusted person. This may be preferable to systems that rely solely on a username and password authentication procedure because such procedures can be cracked. By requiring in-person authentication through the use of coded images, there is little or no chance that access can be gained to the shared partition through a cracked username and password combination. Furthermore, the user can opt to save data using the storage space of a trusted person rather than using their own device for sensitive or valuable data. Moreover, data duplication is reduced because data shared among multiple users occurs on a single device rather than being spread across multiple devices. Another advantage is that data can be transferred easily between removable storage and other storage devices without requiring the removable storage to be removed from the device in which it is housed.

Shared Partitions on a Remote Device

FIG. 1A illustrates a block diagram of an example process for sharing a partition 125 on a first user device 120 (or host device) with a second user device 110 (or client device) and authenticating access to the shared partition 125 using a coded image. Once access is granted, files can be shared over a network. File transfers can be accomplished using peer-to-peer file transfers. In some implementations, no temporary cloud storage is used when transferring files between user devices.

The first user device 120 includes internal or removable storage 121 that is partitioned so that there is a private partition 123 and a shared partition 125. In some embodiments, the storage 121 is dynamically partitioned. This means that partitions created in the storage 121 can be resized, removed, created, reallocated, etc. at any time. In some embodiments, the storage 121 has fixed partitions that are static once created. The private partition 123 can be configured to restrict access to the first user device 120. The shared partition 125 can be configured to restrict access to the second user device 110. In some implementations, the shared partition 125 can be configured to allow access to the first user device 120 and the second user device 110. In some instances, the shared partition 125 can be configured to allow access to a plurality of devices other than the first user device 120.

The process for sharing and accessing the shared partition 125 includes, first, sending a coded image from the first user device 120 to the second user device 110. The coded image can be a matrix barcode such as a Quick Response code or QR code. Other coded images can be used including barcodes, pictures, visual cryptograms, and the like.

Second, the second user device 110 displays the received coded image to the first user device 120. The first user device 120 scans and analyzes the displayed coded image and authenticates access to the second user device 110. Because this requires that the devices be in close proximity, this also requires or encourages the people sharing the storage to meet in person for this initial authentication process. Advantageously, subsequent access can be granted and authenticated using other means other than procedures using coded images.

Authentication occurs by extracting information from the coded image. Information that can be included in the coded image includes, for example and without limitation, username, password, partition identifier, device identifier, etc. In some embodiments, each user accessing the shared partition 125 can have a unique key.

Once authenticated, the first user device 120 grants access to the shared partition 125. The second user device 110 can request to view, access, receive, modify, delete, or store files on the shared partition 125. Files can be transferred between the user devices using a network. File transfers can occur using peer-to-peer techniques. In some embodiments, file transfers occur without utilizing temporary cloud storage. This allows the second user device 110 to have direct access to files stored on the shared partition 125. Advantageously, this can reduce upload times or transfer times due at least in part to not requiring the file to be transferred to a temporary cloud storage, rather, the file is transferred directly to the device requesting access.

In some situations, the first user device 120 may be inaccessible or otherwise occupied making access to files on the shared partition 125 infeasible or impossible. In such situations, the second user device 110 can request access to a file on the first user device 120. If no response is received, a notification can be provided once the first user device 120 is available. In some embodiments, there is no restriction on requests for access to files in the shared partition 125. In certain embodiments, the first user device 120 manages access to the shared partition 125 to improve user experience. This can occur, for example, when the first user device 120 is busy and access to files on the shared partition 125 may not be readily provided. In such situations, the first user device 120 can provide a notification to the second user device 110 that includes an estimate of when the first user device 120 will be capable of providing the file.

In some instances, because the people who own the user devices trust one another and/or know one another, the person desiring access to the shared partition 125 can contact the owner of the first user device 120 to request access to files. The first user can then turn on the first user device 120 or otherwise cause the first user device 120 to be available to the second user device 110.

Figure 1B:
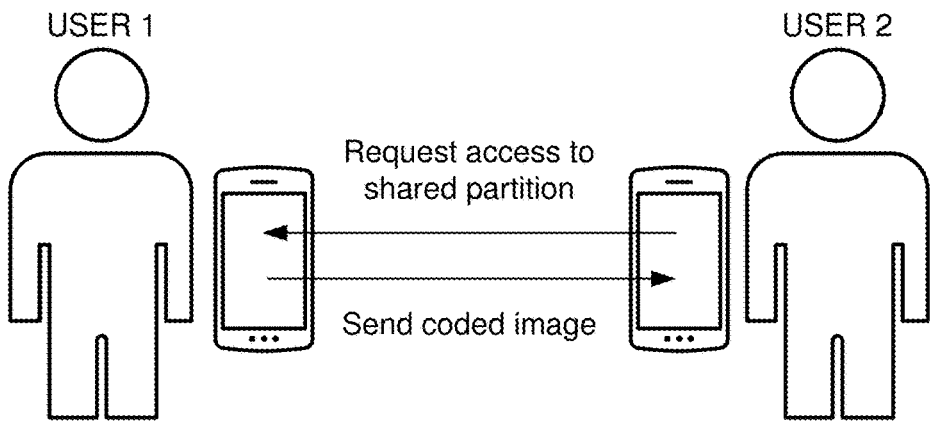
FIG. 1B illustrates an example process for accessing shared partitions on a device using coded images.
Figure 1B:
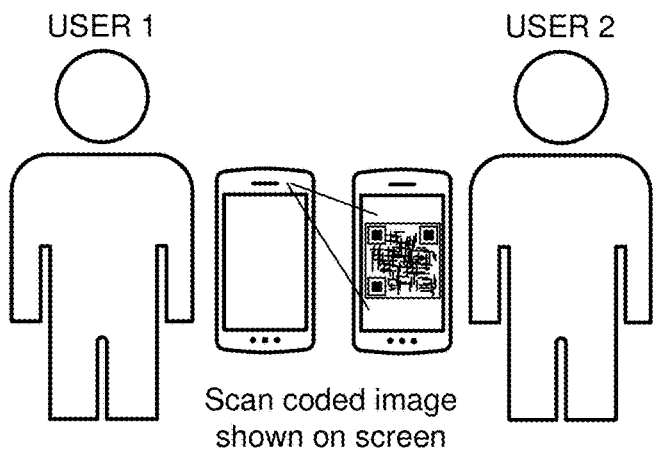
Figure 1B:
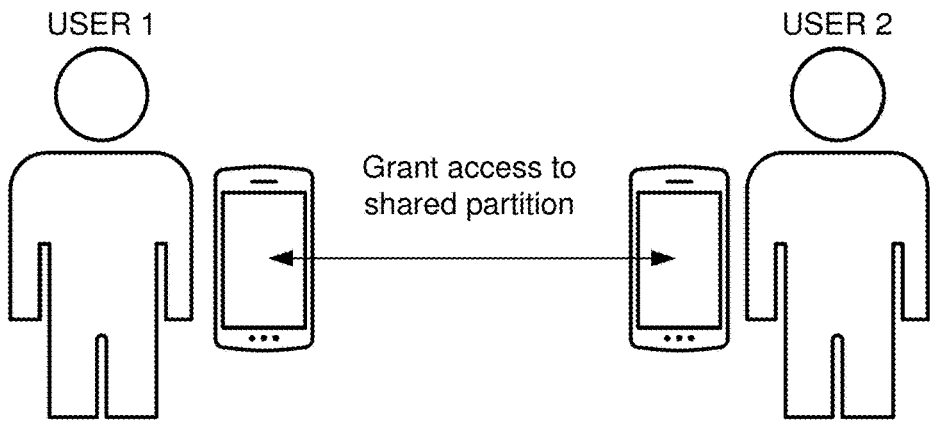

FIG. 1B illustrates an example process for accessing shared partitions on a device using coded images. A first user with a device can create a shared partition on internal storage or removable storage of a device. The shared partition can be shared with a second user's device. The second user requests access to the shared partition either in person or using an application or program on the second device. The first user device then generates a coded image (e.g., a matrix barcode) that is sent electronically to the second device.

Once the second device receives the coded image, the second user must come in close proximity to the first user and/or the first device so that the first device can scan the coded image to authorize access to the shared partition. If authentication succeeds, the second user device gains access to the shared partition and can view, store, and access files stored thereon. Access to the files occurs over the network, allowing the first device and second device to be spatially removed from one another after the in-person authentication process. Furthermore, once authorization is granted, subsequent access to the shared partition can occur without requiring physical proximity. For example, an alternative method can be used for authentication such as exchanging stored keys, employing a username and password, or the like.

In some embodiments, the first device may be inaccessible or unavailable for providing access to the shared partition. Due to the relationship between the first and second user, the second user can contact the first user to request that the first device be made available to allow the second user to access the shared partition. In such instances, the first device can provide a notification to the second device when the first device becomes available.

It may also occur that file transfers would occur slowly due to the first device being in a location with no network connection or a poor network connection or the first device being occupied with other tasks. In such situations, the first device can provide a notification indicating an estimate for when the first device could provide access to the shared partition. Further notifications may be provided when the first device is ready to provide access to the shared partition.

In some embodiments, the second device can request a file from the shared partition on the first device. The first device can respond by transferring the file to the second device if the first device is available (e.g., not occupied or taxed with other tasks). If the first device is unavailable or taxed with other tasks, the first device can provide a notification indicating when the file can be transferred to the second device. Similarly, the first device may provide a notification when it is ready to transfer the requested file.

Shared Storage Systems

Figure 2:
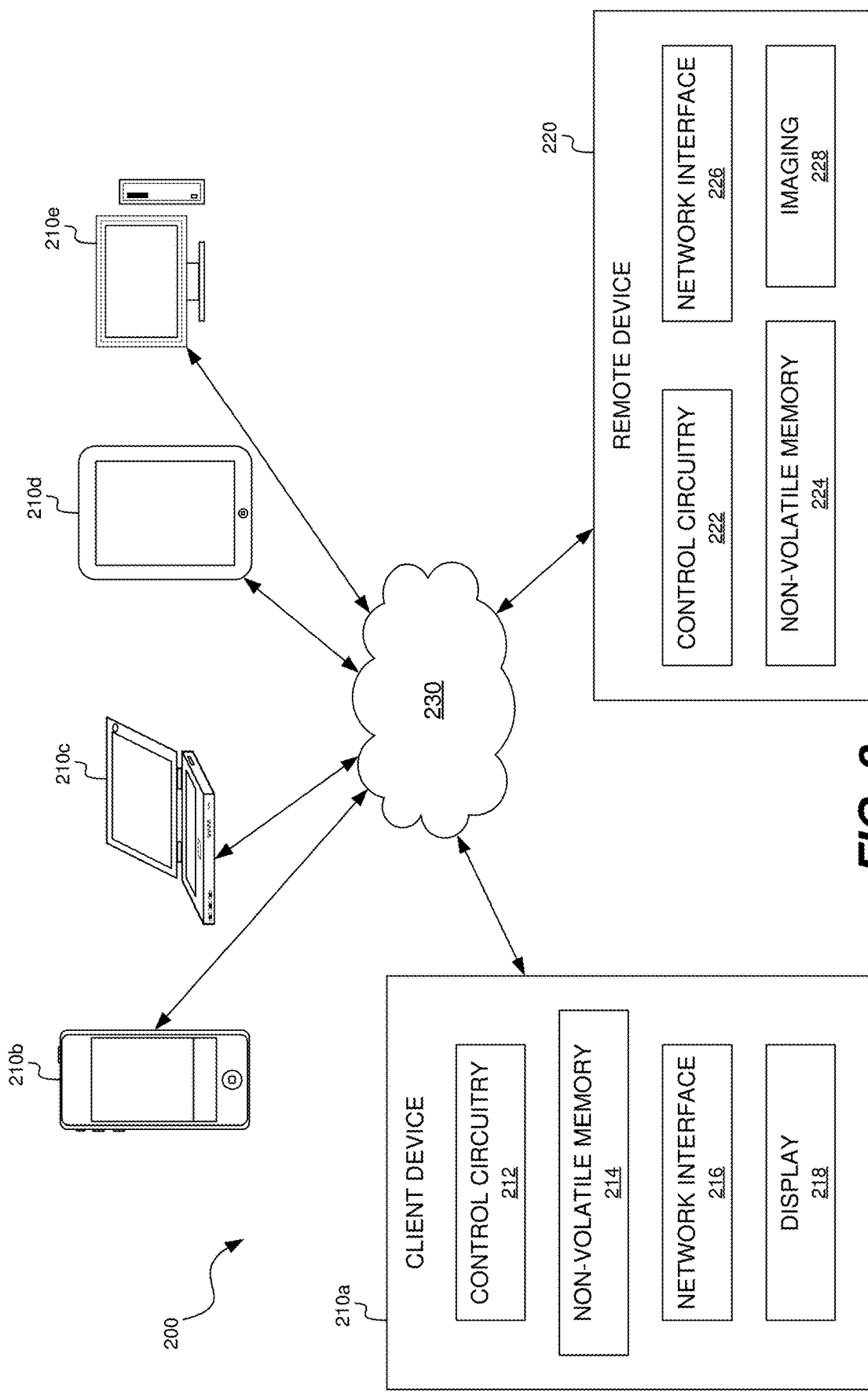
FIG. 2 illustrates a block diagram of an example system architecture that includes a remote device with storage partition for sharing with one or more other devices.

FIG. 2 illustrates a block diagram of an example system architecture 200 that includes a remote device 220 with storage partitioned for sharing with one or more other devices. The remote device 220 is communicatively coupled to one or more client devices 210a-210e. The remote device 220 is configured to receive requests over a network 230 from individual client devices for files stored on the shared partition(s) of the remote device 220. In response to the requests, the remote device 220 is configured to grant access to the client devices if prior authentication has occurred. If prior authentication has not occurred, the remote device 220 is configured to generate and transmit a coded image to the requesting client device. Authentication can then proceed when the client device presents or displays the coded image to the remote device 220, the remote device 220 scans the coded image, and authenticates the request for access based on data extracted from the scanned coded image. If access to the shared partition is granted and authenticated, the remote device 220 is configured to allow the requesting client device to view, save, and/or access files on the shared partition.

The remote device 220 includes control circuitry 222, non-volatile memory 224, a network interface 226, and an imaging system 228. The control circuitry 222 of the remote device 220 can include one or more general-purpose processing devices such as a microprocessor, central processing unit, or the like one. More particularly, the control circuitry 222 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The control circuitry 222 may also be one or more special-purpose processing devices such as an application specific integrated circuit (ASIC), a field programmable gate array (FPGA), a digital signal processor (DSP), network processor, or the like. The control circuitry 222 may be configured to execute certain software applications, drivers, or firmware for implementing the functionality described herein.

The remote device 220 may store data and/or data objects on the non-volatile memory 224 in one or more partitions that may be accessed by the client devices 210a-210e. The non-volatile memory 224 can include internal storage of the remote device 220 and/or removable storage installed with or connected to the remote device 220. The remote device 220 can utilize various types of non-volatile memory 224 such as a HDD, NAND memory (e.g. SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. The non-volatile memory 224 can also utilize magnetic media (e.g., magnetic discs, shingled magnetic recording (SMR) media/discs, etc.). New types of emerging non-volatile memory could also be used such as Program in Place or Storage Class Memory (SCM) such as ReRam, PCM, and MRAM.

While certain embodiments are described herein, it should be understood that different types of storage devices and RAM technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile random-access memory could also be used, such as non-volatile dual in-line memory module (NVDIMM), NVDIMM-N, NVDIMM-P, and/or NVDIMM-F.

The imaging system 228 of the remote device 220 can include any suitable imaging system such as a camera, barcode scanner, or the like. The imaging system 228 is configured to generate a digital image that allows the control circuitry 222 to process the digital image. For authentication purposes, the imaging system 228 can be configured to generate a digital image of the display 218 of the client device 210a when it is displaying the coded image. This digital image can be analyzed by the control circuitry of the remote device 220 to extract information relevant to authentication, as described in greater detail herein.

The types of client devices that may access the remote device 220 can include phones 210b, such as smartphones, laptop computers 210c, tablet computers 210d, desktop computers 210e, video game consoles 210f, wearable computers (not shown) and/or other network-connected computing devices. The network 230 may be a local area network (LAN), a wide area network (WAN) (e.g., the Internet), or other type of computer network, and the connections between the various client components of the architecture 200 and the network 230 may be either wired or wireless. The remote device 220 includes the network interface 226 (e.g., a network interface card, a Wi-Fi interface, etc.) to enable communication over the network 230 to the client devices 210a-210e.

A user can access files on a shared partition of the remote device 220 using a client computing device 210a-210e. As used herein, the term remote device includes devices that are physically separate from a particular client device, allowing for access to the non-volatile memory 224 of the remote device 220 over the network 230. For example, a client computing device 210a-210e can send a request to the remote device 220 for a file and the remote device 220 can retrieve the file from a shared partition of the non-volatile memory 224 if the requesting client device is authorized to access the shared partition. The requested file can be transferred to the client device 210a-210e over the network 230. The file transfer can utilize any suitable peer-to-peer or one-to-one file transfer protocols. In some embodiments, file transfer excludes temporary cloud storage.

The remote device 220 is configured to execute instructions (e.g., stored on the non-volatile memory 224) that cause the remote device 220 to perform any one or more of the methodologies (e.g., operations, methods, functions, etc.) disclosed herein (e.g., using the control circuitry 222). The remote device 220 may be embodied in any suitable device including network attached storage devices, a server, a router, a general personal computer, a laptop, a tablet, a phone, etc., within which a set of instructions, for causing the machine to perform any one or more of the methodologies disclosed herein, may be executed. The remote device 220 may operate in the capacity of a server machine in a client-server network environment.

Thus, the remote device 220 stores files in one or more partitions on the non-volatile memory 224. Partitions can be designated as private to the remote device 220 or designated as shared to allow authorized access to one or more of the client devices 210a-210e. The remote device 220 uses the network interface 226 to receive client requests and to transmit data. The remote device 220 uses the imaging system 228 to authenticate coded images presented by the client devices 210a-210e. The control circuitry 222 controls operation of the imaging system 228, the network interface 226 and the non-volatile memory 224. Computer executable instructions are stored on the non-volatile memory 224. The control circuitry 222 is configured to execute these instructions to create partitions on the non-volatile memory 224, to generate coded images for authentication purposes, to use the imaging system 228 to scan coded images displayed by a client device, to analyze the scanned coded images to determine whether a client device is authorized to access the shared partition, and to transfer, receive, and store files on the shared partition, as described in greater detail herein. The control circuitry 222 is further configured to provide notifications and other communication with the client devices 210a-210e regarding availability of the shared partition, availability of requested files on the shared partition, and/or estimates for when requested files may be transferred to the requesting client device.

The client device 210a is a representative client device and, like the remote device 220, includes control circuitry 212, non-volatile memory 214, and a network interface 216 that may each be similar to the corresponding elements of the remote device 220. The client device 210a further includes a display 218 (e.g., LCD display, LED display, or the like) configured to present images to the imaging system 228 of the remote device 220.

The client device 210a uses the network interface 216 to transmit client requests to the remote device 220 and to receive data from the remote device 220. The client device 210a uses the display 218 to display coded images sent by the remote device 220. The control circuitry 212 controls operation of the display 218, the network interface 216, and the non-volatile memory 214. Computer executable instructions are stored on the non-volatile memory 214. The control circuitry 212 is configured to execute these instructions to generate requests for access to a shared partition of the remote device 220, to receive a coded image from the remote device 220, to display the coded image on the display 218, to transfer files to the remote device 220 for storage on the shared partition, and to receive requested files from the remote device 220.

Figure 3A:
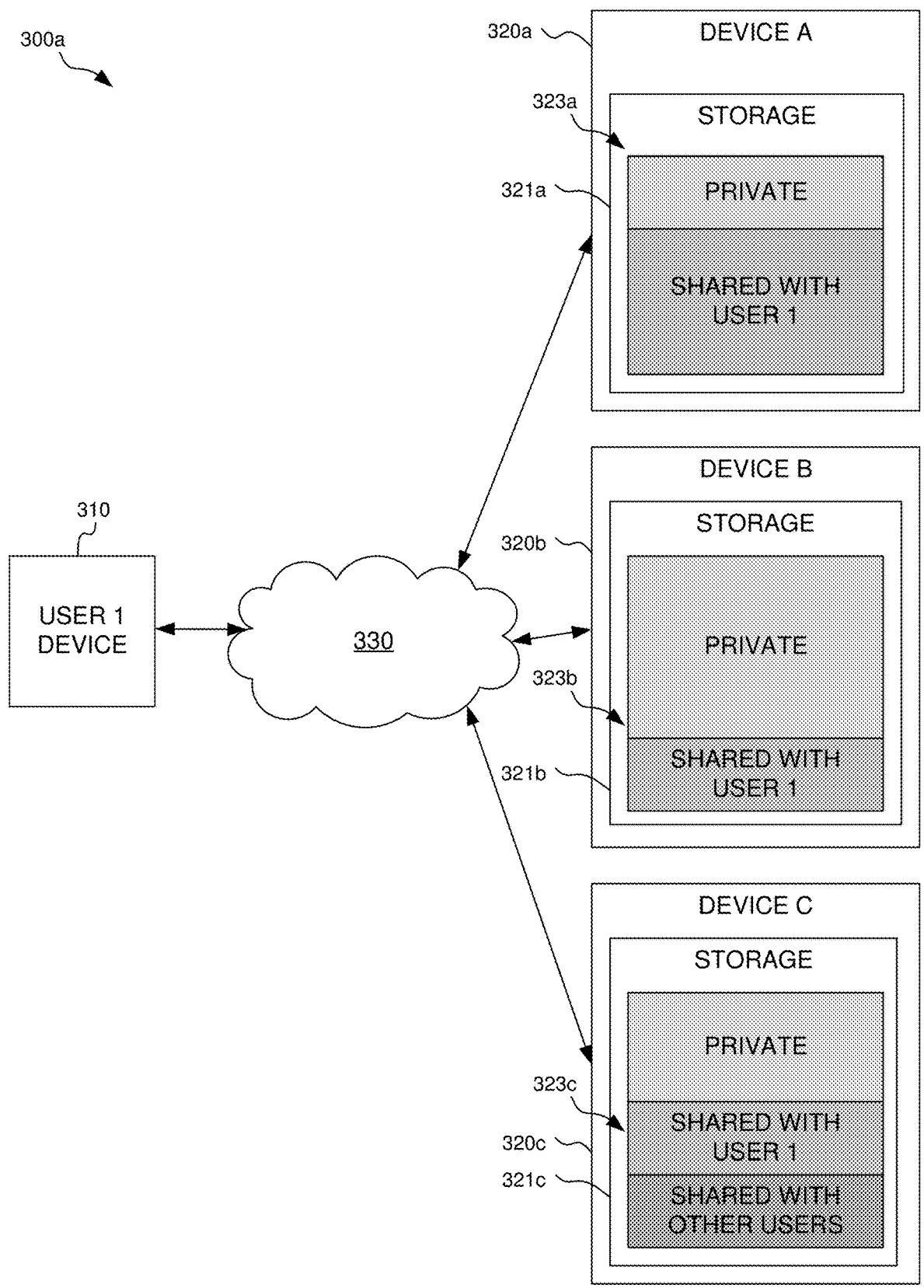
FIG. 3A illustrates a block diagram of a user device accessing a local cloud storage system formed from a plurality of devices each with storage having partitions with at least one shared partition for the user device.

FIG. 3A illustrates a block diagram of a user device 310 accessing a local cloud storage system 300a formed from a plurality of devices 320a-320c each with storage 321a-321c having partitions 323a-323c with at least one shared partition for the user device 310. The user device 310 can access the various shared partitions of the devices 320a-320c over a network 330, similar to the network 230 described herein with reference to FIG. 2.

Device A 320a includes storage 321a (e.g., internal or removable storage) that includes partitions 323a for private access (e.g., access restricted to device A 320a) and shared access with user device 310. In some embodiments, the partition with shared access can be available for the user device 310 but may be restricted for device A 320a. This may be accomplished using encryption, for example. In certain embodiments, both the user device 310 and device A 320a can access the shared partition.

Similar to device A 320a, device B 320b includes storage 321b (e.g., internal or removable storage) that includes partitions 323b for private access (e.g., access restricted to device B 320a) and shared access with user device 310. Device C 320c includes storage 321c (e.g., internal and/or removable storage) that includes partitions 323c for private access, shared access with the user device 310, and shared access with other user devices (not shown). Thus, device C 320c can be configured to share storage partitions with a plurality of different devices.

To gain access to the partitions of the devices 320a-320c, the user device 310 participates in the authentication processes described herein for each device 320a-320c. For example, the user device 310 can gain access to the shared partition of device A 320a by receiving a coded image generated by device A 320a and then presenting the coded image to the device A 320a. This process is repeated for device B 320b and device C 320c.

The local cloud storage configuration 300a can be used as redundant storage for the device 310. For example, a particular file may be stored on two or more of the shared partitions 321a-321c. The local cloud storage configuration 300a can be used as backup for the device 310. For example, backups of selected information can be stored to one or more of the shared partitions of the devices 320a-320c. This can be done in response to indications of declining health of the storage of user device 310, by way of example.

Figure 3B:
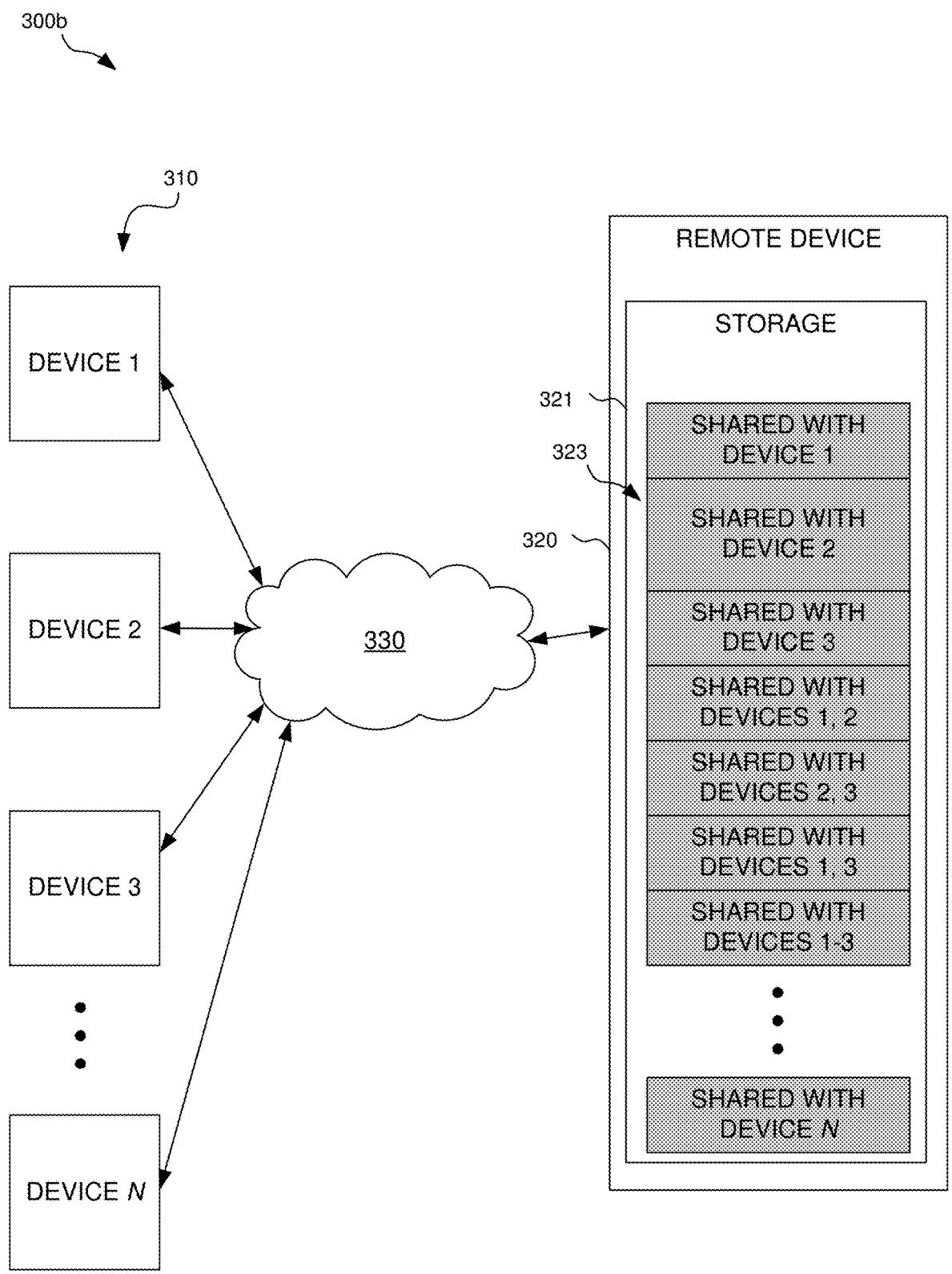
FIG. 3B illustrates a block diagram of a plurality of user devices with access to a local cloud storage system formed from a single remote device with storage having partitions that are shared in various permutations between the devices.

FIG. 3B illustrates a block diagram of a plurality of user devices 310 with access to a local cloud storage system 300b formed from a single remote device 320 with storage 321 having partitions 323 that are shared in various permutations between the devices 310. For example, the remote device 320 can include private storage, storage shared with a single device of the devices 310, storage shared with some of the devices 310, and/or storage shared with all of the devices 310. Access to the shared partitions can be managed using the authentication processes disclosed herein. In particular, individual devices 310 can be required to present a coded image received from the remote device 320 prior to gaining access to a shared partition for the first time. In some embodiments, individual shared partitions require a unique authentication interaction to gain access to that shared partition. This may mean, for example, a unique coded image can be generated for each shared partition and device pairing. In certain embodiments, authentication may be required for a single device where that authentication is valid for multiple shared partitions to which the device has access.

The local cloud configurations 300a and 300b can be combined. For example, multiple remote devices can each be configured to share one or more partitions with multiple client devices. Thus, an individual remote device can be configured to share one or more partitions with a plurality of client devices. Similarly, an individual client device can be configured to access shared partitions on one or more remote devices.

Figure 4:
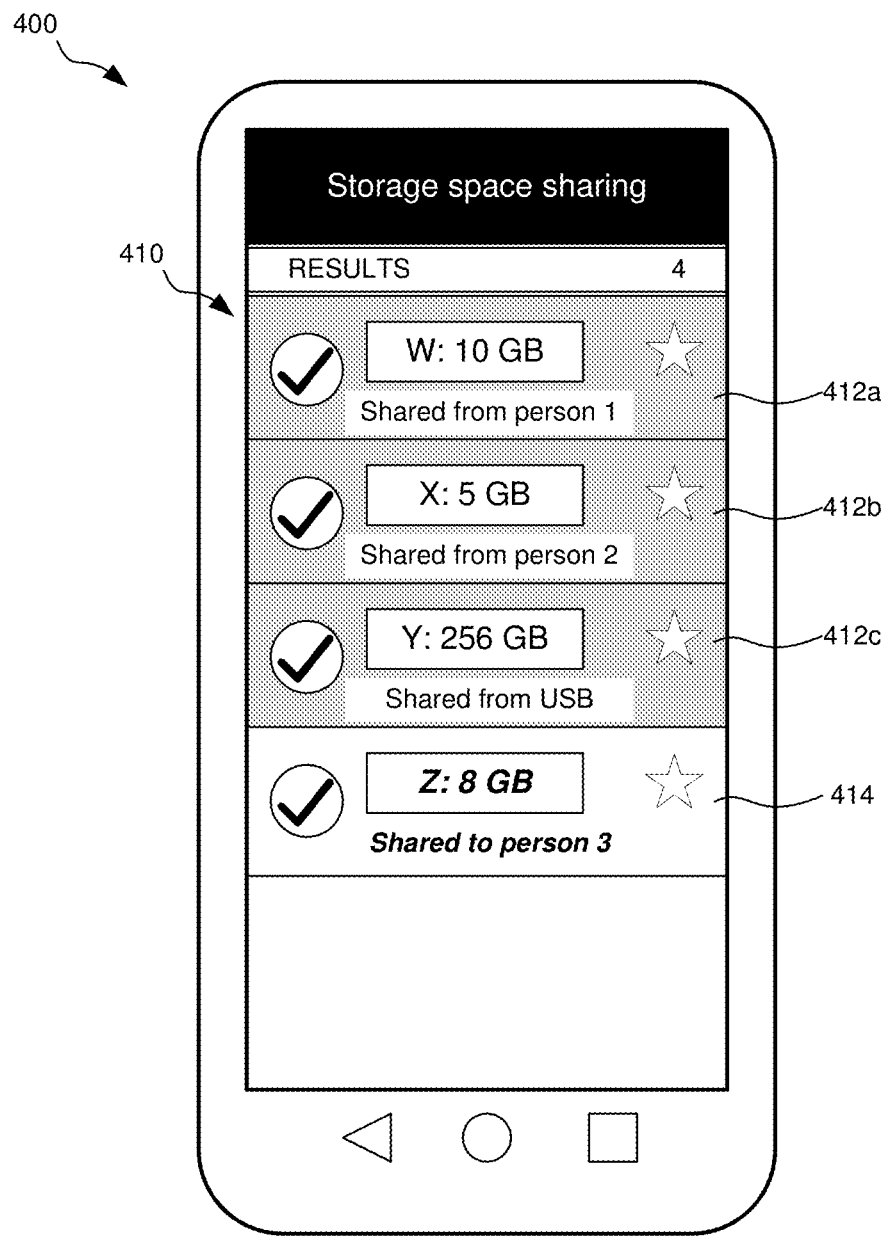
FIG. 4 illustrates an example user interface for a device that is configured to share storage with a client device and to access shared storage on a remote device.

FIG. 4 illustrates an example user interface 410 for a device 400 that is configured to share storage with a client device and to access shared storage on a remote device. The user interface 410 can be configured to enable a user to dynamically partition internal or removable storage for sharing. Furthermore, the user interface 410 can be configured to enable access to shared storage from different remote devices, including user devices and USB storage as examples.

The first portion 412a of the user interface 410 illustrates that the device 400 has access to 10 GB of storage from person 1. The second portion 412b of the user interface illustrates that the device 400 has access to 5 GB of storage from person 2. The third portion 412c of the user interface 410 illustrates that the device 400 has access to 256 GB of storage from a USB device. A fourth portion 414 of the user interface 410 illustrates that the device 400 is configured to share 8 GB of storage with person 3. Thus, the user device 400 has access to a total of 271 GB of data on remote devices. Furthermore, the user device 400 is sharing 8 GB of its own internal or removable storage. In certain implementations, storage not indicated as shared can be configured to be private to the device 400. The user interface 410 can be configured to enable the addition of shared partitions and/or to request or monitor shared storage on remote devices.

In some embodiments, the user interface 410 can be configured to display a coded image received from a remote device to which the device 400 has requested access to storage. In some embodiments, the device 400 is configured to scan a coded image presented on the display of a potential client device to authenticate a coded image generated by the device 400. This can be done in response to a request from a potential client device for access to a shared partition on the internal or removable storage of the device 400.

Figure 5:
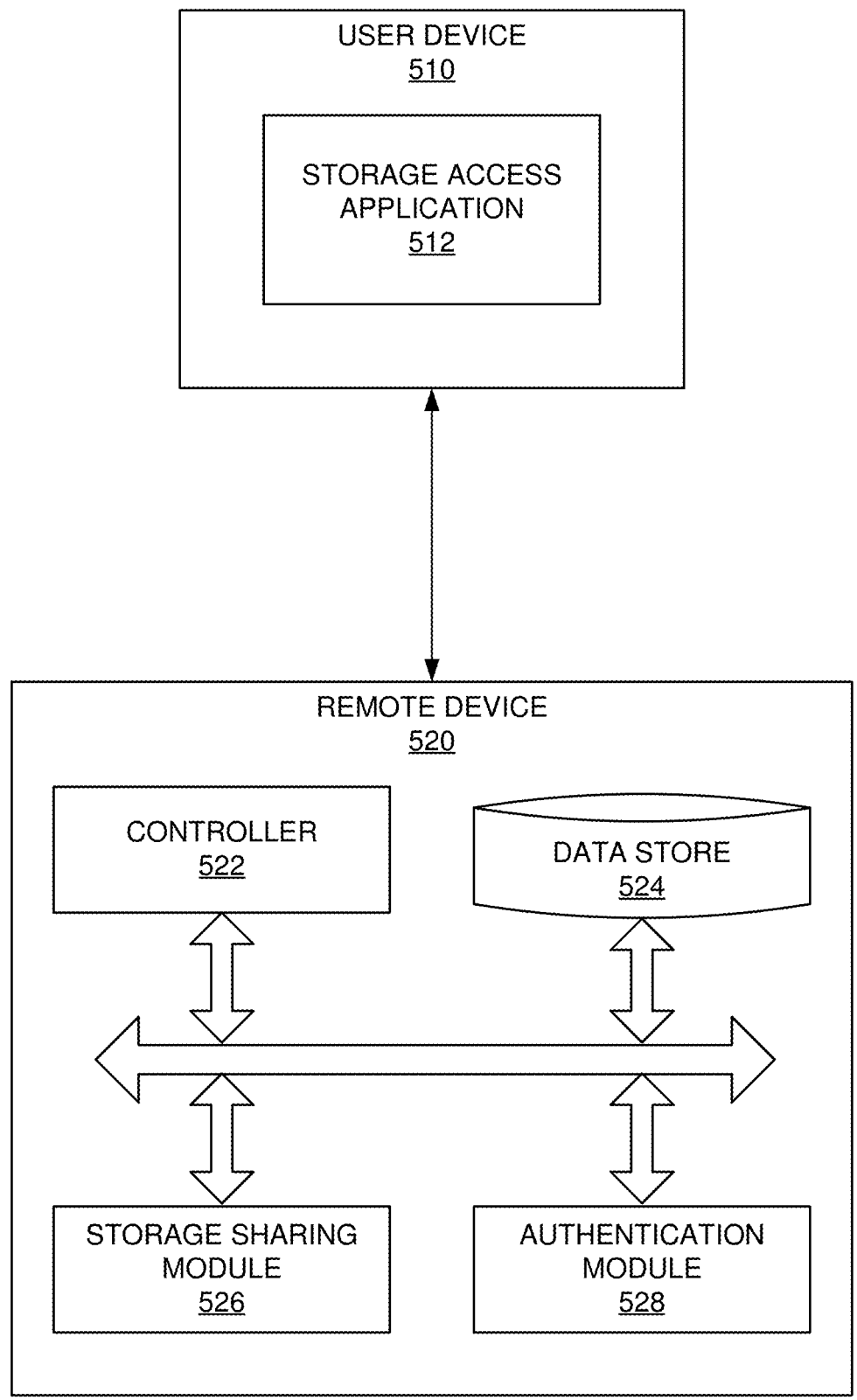
FIG. 5 illustrates a block diagram of an example remote device configured to manage access to a shared partition for a client device.

FIG. 5 illustrates a block diagram of an example remote device 520 configured to manage access to a shared partition for a client device 510. The remote device 520 includes a controller 522, a data store 524, a storage sharing module 526, and an authentication module 528. The client device 510 includes a storage access application 512 that is configured to access files on a shared partition of the remote device 520.

The controller 522 is configured to control operation of the data store 524, the storage sharing module 526, and the authentication module 528. The controller 522 can be implemented using the control circuitry described herein with reference to FIG. 2.

The data store 524 can be configured to store files using object-oriented storage, flat file storage, or hierarchical file storage. The data store 524 can include a database or other suitable structured set of data. The data store 524 is configured to partition space wherein partitions can be private to the remote device 520 or shared with one or more external devices, such as the user device 510. The data store 524 can be implemented using any combination of non-volatile and volatile memory, as described herein with reference to FIG. 2.

The storage sharing module 526 is configured to manage partitioning of the data store 524 and to manage files on the partitions of the data store 524. The storage sharing module 526 can be implemented using any suitable combination of software, firmware, and hardware. The storage sharing module 526 is configured to partition the data store 524. In some embodiments, the storage sharing module 526 can be configured to dynamically partition the data store 524. For example, the storage sharing module 526 can create, remove, re-size, and/or adjust partitions of the data store 524 in response to commands received on the remote device 520 (e.g., through the use of a user interface or commands received over a communications network).

The storage sharing module 526 is configured to respond to requests for access to files in the data store 524, providing that the request is authorized by the authentication module 528. For example, the user device 510 can request transfer of a file in a shared partition of the data store 524 and, in response, the storage sharing module 526 can transfer the requested file to the user device 510 over a network. As another example, the user device 510 can request that a file be saved in the shared partition of the data store 524 and, in response, the storage sharing module 526 can receive the file from the user device 510 and store the received file in the shared partition of the data store 524. As another example, the user device 510 can request to view files in the shared partition of the data store 524 and, in response, the storage sharing module 526 can provide information regarding the requested files.

The storage sharing module 526 is configured to manage transferring files between the user device 510 in the remote device 520. In some embodiments, the storage sharing module 526 is configured to transmit files to the user device 510 and/or to receive files from the user device 510 using peer-to-peer file transfer techniques. In certain implementations, the storage sharing module 526 is configured to not use temporary cloud storage for file transfers.

The storage sharing module 526 is configured to provide information regarding file access requests to the user device 510. For example, a request from the user device 510 can be received by the remote device 520 and the storage sharing module 526 can respond with an estimate of when the requested file can be transferred to the user device 510.

The authentication module 528 is configured to manage access to partitions of the data store 524. The authentication module 528 can be implemented using any suitable combination of software, firmware, and hardware. The authentication module 528 is configured to grant access to the data store 524 responsive to receiving appropriate credentials from the user device 510.

If the user device 510 has not accessed the shared partition of the data store 524 previously, the authentication module 528 can generate a coded image that includes information sufficient for authorizing access to the shared partition of the data store 524. The coded image can be, for example, a two-dimensional barcode such as a QR code. The coded image can be used to encode information such as username, password, partition information, etc. In some embodiments, the authentication module 528 is configured to require a new authorization using a coded image when certain criteria have been met. For example, the criteria can be that a new authentication process using a coded image has to be completed if the user device 510 has not accessed the shared partition of the data store 524 for a time that exceeds a threshold amount of time. As another example, the criteria can be that a new authentication process using a coded image has to be completed for each unique user device regardless of whether it is the same person using the different devices.

The authentication module 528 is configured to scan a coded image presented or displayed by the user device 510. The authentication module 528 analyzes the scanned coded image to extract authentication information such as credentials. If the credentials are appropriate, the authentication module 528 grants access to the shared partition of the data store 524. As described elsewhere herein, the authentication module 528 can generate a coded image specific to a particular combination of user device and shared partition in the data store 524 or the authentication module 528 can generate a coded image that enables a particular user device to access any appropriate shared partition in the data store 524.

The client device 510 includes a storage access application 512 that is configured to negotiate access to shared partitions of the remote device 520, to receive files from a shared partition of the remote device 520, to store files on a shared partition of the remote device 520, and to view files on a shared partition of the remote device 520. The storage access application 512 can be configured to receive a coded image from the remote device 520 and to display the coded image to gain access to a shared partition on the remote device 520. The storage access application 512 can be configured to negotiate access to shared partitions on one or more remote devices. This can be used to provide storage similar to a cloud storage service where the storage is provided by devices controlled by people whom the user trusts and/or with whom the user is well acquainted rather than a third-party entity.

Methods for Accessing and Authenticating Shared Partitions

Figure 6:
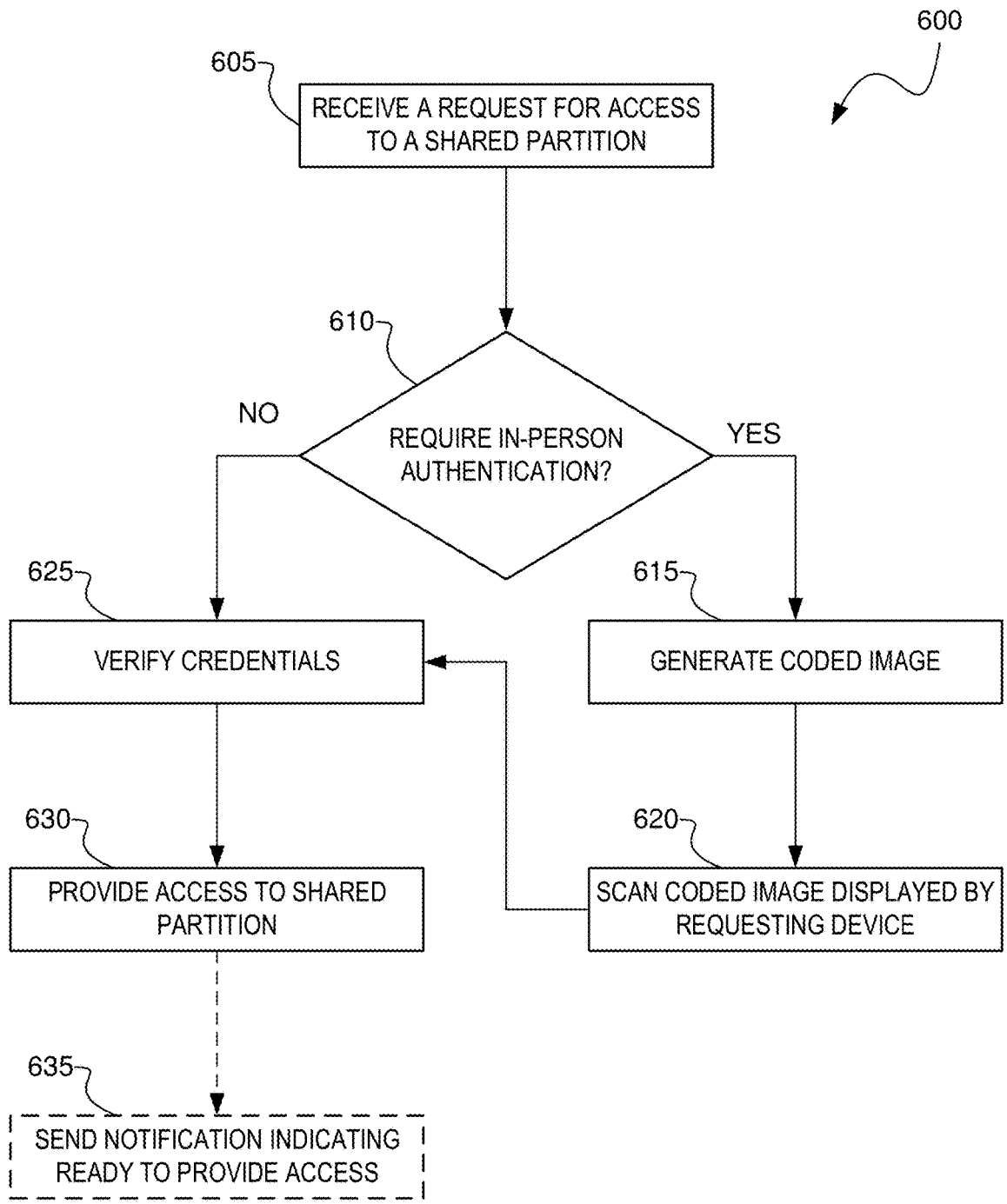
FIG. 6 illustrates a workflow process for authenticating access to a shared partition for a client device.

FIG. 6 illustrates a workflow process 600 for authenticating access to a shared partition for a client device. For example, the workflow process 600 may be performed by a controller of a remote device, such as the remote devices 120, 220, 320, 520. For illustrative purposes, the process 600 is explained below in connection with the remote device 220. Certain details relating to the process 600 are explained in more detail with respect to FIGS. 1-5. Depending on the embodiment, the process 600 may include fewer or additional blocks, and the blocks may be performed in an order that is different from illustrated.

At block 605, the remote device receives a request from a client device for access to a shared partition. The shared partition can pre-exist the request from the client device or it can be dynamically created in response to the request. The request can include credentials and/or other authentication information. The request can be received over a network, such as the Internet. In some embodiments, the request includes information about the shared partition to which access is requested. The information can include, for example, the size of the partition, the users or devices authorized to share the partition, a file on the partition to be transferred or viewed, or the like.

At block 610, the remote device determines whether in-person authentication is required. The determination can be based on one or more criteria. In some embodiments, if the client device requesting access has not been previously approved or authenticated to access the shared partition, the remote device can require in-person authentication. In various embodiments, if a certain amount of time has passed since the last time the requesting client device has accessed the shared partition, the remote device can require in-person authentication. In certain embodiments, a configuration setting can dictate whether in-person authentication is required.

At block 615, responsive to the remote device determining that in-person authentication is required, the remote device generates a coded image. The coded image can be any image or two-dimensional pattern capable of encoding information. An example of a coded image is a QR code.

The coded image can be used to require in-person authentication because the client device must be in close physical proximity so that the remote device can scan a coded image displayed by the client device at block 620. The remote device analyzes the scanned image to verify that it is either the same coded image sent to the client device or that the coded image contains certain information encoded in the original coded image sent to the client device.

At block 625, the remote device verifies the credentials of the client device requesting access. If in-person authentication has not been required, then the remote device can negotiate authorization using another technique such as the exchange of keys or a username and password combination. If in-person authentication has been required, the remote device can verify the credentials of the client device based at least in part on information encoded in the coded image displayed by the local device and scanned by the remote device.

At block 630, the remote device provides access to the shared partition responsive to verifying the credentials of the client device. Providing access to the shared partition can include allowing the client device to view files stored on the shared partition, to store new files on the shared partition, to modify or delete existing files on the shared partition, and/or to transfer one or more files from the shared partition to the client device. The transfer of files can occur over a network, such as the Internet. In some embodiments, the remote device is configured to not use temporary cloud storage when transferring files to the client device.

Optionally at block 635, the remote device can be configured to send a notification to the client device when the remote device is ready to provide access to the shared partition. Access to the shared partition may not occur promptly upon verifying the client device's credentials. This may be because the remote device is occupied or otherwise unavailable to provide access. In some embodiments, the remote device provides an estimate for when the client device can access the shared partition. Similarly, the remote device may provide an estimate for when a requested file can be transferred to the client device in response to a request for that file.

Figure 7:
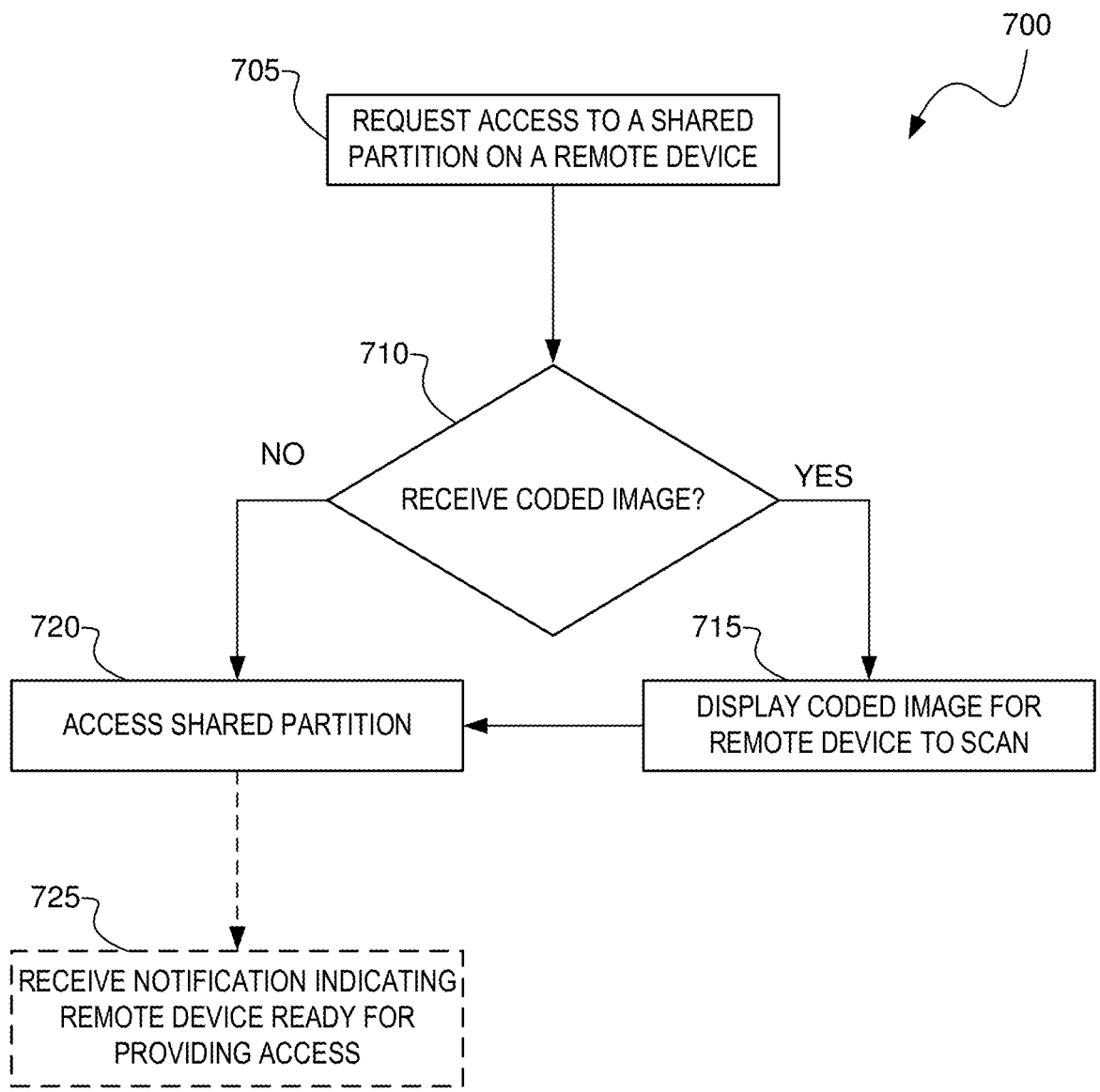
FIG. 7 illustrates a workflow process for accessing a shared partition on a remote device.

FIG. 7 illustrates a workflow process 700 for accessing a shared partition on a remote device. For example, the workflow process 700 may be performed by a controller of a client device, such as the client device 110, 210, 310, 510. For illustrative purposes, the process 700 is explained below in connection with the client device 210a. Certain details relating to the process 700 are explained in more detail with respect to FIGS. 1-5. Depending on the embodiment, the process 700 may include fewer or additional blocks, and the blocks may be performed in an order that is different from illustrated.

At block 705, the client device requests access to a shared partition on a remote device. The request can be transmitted over a network, such as the Internet. The request can include credentials or other information about the partition to be accessed. In some embodiments, the request can include a specific file or files on the shared partition.

At block 710, the client device may receive a coded image. If the client receives a coded image from the remote device, the client device displays the coded image for the remote device to scan at block 715. This can be done to require in-person authentication to gain access to the shared partition, as described herein. If the client device does not receive a coded image from the remote device, the client device can receive permission to access the shared partition at block 720. Permission to access the shared partition can be based at least in part on credentials provided in the requests, credentials provided at another time (e.g., prior to the request being sent or after the request being sent), or using keys.

Optionally at block 725, the remote device receives a notification indicating that the remote device is ready to provide access to the shared partition. In some embodiments, the notification includes an estimate for when access can be granted to the shared partition. In certain embodiments, the notification includes an estimate for when a requested file or files can be transferred to the client device.

Additional Embodiments

Those skilled in the art will appreciate that in some embodiments, other types of dynamic partitioning to share storage and in-person authentication can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A host device for sharing storage with a client device, the host device comprising:
an imaging system;
non-volatile memory configured to store data, the non-volatile memory including a shared partition;
a network interface configured to transfer data over a network; and
control circuitry coupled to the imaging system, the network interface, and the non-volatile memory, the control circuitry configured to:
receive a request for access to the shared partition from a client device over the network;
responsive to determining that the client device has not previously accessed the shared partition, generate a coded image that encodes credential information;
transmit the coded image to the client device over the network;
capture, using the imaging system, a displayed coded image shown on a display of the client device, the client device in physical proximity to the host device;
analyze an image of the displayed coded image acquired with the imaging system; and
provide access to the shared partition responsive to verifying that the displayed coded image includes the credential information encoded in the generated coded image.

2. The host device of claim 1, wherein the coded image comprises a matrix barcode.

3. The host device of claim 1, wherein the control circuitry is further configured to transfer a file from the shared partition to the client device over the network.

4. The host device of claim 3, wherein the file is transferred without using temporary cloud storage.

5. The host device of claim 1, wherein the control circuitry is further configured to send a notification to the client device indicating an estimate of a time that access to the shared partition will be provided to the client device.

6. The host device of claim 1, wherein the control circuitry is further configured to dynamically generate the shared partition of the non-volatile memory.

7. The host device of claim 1, wherein the control circuitry is further configured to receive a file from the client device for storage on the shared partition.

8. The host device of claim 1, wherein the non-volatile memory includes removable storage.

9. The host device of claim 1, wherein the non-volatile memory further includes a private partition that has access restricted to the host device.

10. A method for sharing storage with a client device, the method comprising:
receiving a request for access to a shared partition from a client device over a network;
responsive to determining that the client device has not previously accessed the shared partition, generating, at a host device, a coded image that encodes credential information;
transmitting the coded image to the client device over the network;
scanning, using an imaging system of the host device, a displayed coded image displayed by the client device, the client device in physical proximity to the host device; and
providing access to the shared partition responsive to verifying that the displayed coded image includes the credential information encoded in the generated coded image.

11. The method of claim 10, wherein the coded image is generated responsive to determining that the client device has not previously accessed the shared partition.

12. The method of claim 10, wherein the coded image comprises a matrix barcode.

13. The method of claim 10, further comprising transferring a file from the shared partition to the client device over the network.

14. The method of claim 13, wherein the file is transferred without using temporary cloud storage.

15. The method of claim 10, further comprising dynamically generating the shared partition.

16. The method of claim 10, further comprising receiving a file from the client device for storage on the shared partition.

17. The method of claim 10, wherein the shared partition is provided on removable storage of the host device.

18. The method of claim 10, further comprising generating a private partition that is not available to the client device.

19. A host device for sharing storage with a client device, the host device comprising:
- imaging means for generating digital images;
- non-volatile memory means for storing data, the non-volatile memory means including a shared partition;
- network interface means for transferring data over a network; and
- control circuitry means to operate the imaging means, the network interface means, and the non-volatile memory means, the control circuitry means configured to:
  - receive a request for access to the shared partition from a client device over the network;
  - responsive to determining that the client device has not previously accessed the shared partition, generate a coded image that encodes credential information;
  - transmit the coded image to the client device over the network;
  - capture, using the imaging means, a displayed coded image shown on a display of the client device, the client device in physical proximity to the host device;
  - analyze an image of the displayed coded image acquired with the imaging means; and
  - provide access to the shared partition responsive to verifying that the displayed coded image includes the credential information encoded in the generated coded image.

* * * * *